United States Patent [19]

Vlamakis

[11] Patent Number: 4,856,635

[45] Date of Patent: Aug. 15, 1989

[54] STARTING CLUTCH FOR A CONTINUOUSLY VARIABLE TRANSMISSION

[75] Inventor: Maria S. Vlamakis, Justice, Ill.

[73] Assignee: Borg-Warner Automotive, Inc., Troy, Mich.

[21] Appl. No.: 102,450

[22] Filed: Sep. 29, 1987

[51] Int. Cl.$^4$ .................. F16D 25/064; F16D 13/64; F16D 13/72

[52] U.S. Cl. .................. 192/70.12; 192/85 AA; 192/106 F; 192/113 B

[58] Field of Search ............. 192/70.12, 70.14, 70.21, 192/70.28, 85 AA, 89 B, 106 F, 113 B

[56] References Cited

U.S. PATENT DOCUMENTS

| | | | |
|---|---|---|---|
| 940,679 | 11/1909 | Evans | 192/70.28 X |
| 2,806,568 | 9/1957 | Bliss | 192/85 AA X |
| 2,876,743 | 3/1959 | Maki | 192/85 AA X |
| 2,966,978 | 1/1961 | Kaptur | 192/106 F |
| 3,213,984 | 10/1965 | Cook | 192/85 AA X |
| 3,236,349 | 2/1966 | Wiggins et al. | 192/85 AA X |
| 3,747,731 | 7/1973 | Smirl | 192/104 R |
| 4,014,619 | 3/1977 | Good et al. | 403/359 |
| 4,238,013 | 12/1980 | Goscenski, Jr. | 192/70.14 X |
| 4,520,912 | 6/1985 | Ferris et al. | 192/85 AA |
| 4,679,677 | 7/1987 | Olzono et al. | 192/85 AA |
| 4,699,259 | 10/1987 | McColl | 192/70.12 |
| 4,706,789 | 11/1987 | McColl et al. | 192/85 AA X |
| 4,709,795 | 12/1987 | Ferris | 192/106 F |

FOREIGN PATENT DOCUMENTS

| | | | |
|---|---|---|---|
| 223177 | 7/1959 | Australia | 192/89 B |
| 940405 | 10/1963 | United Kingdom | 192/85 AA |

Primary Examiner—Leslie A. Braun
Assistant Examiner—Richard M. Lorence
Attorney, Agent, or Firm—Robert L. Zieg; James J. Jennings; James A. Geppert

[57] ABSTRACT

A hydraulically-actuated starting clutch utilized in a continuously variable transmission which includes a rotating shaft havng a housing rotating therewith, a pressure chamber in the housing receiving a piston, a pressure plate and an end plate in the housing to rotate therewith, at least one clutch plate between the pressure and end plates and operatively connected to a sleeve shaft encompassing the rotating shaft, and a diaphragm spring between the piston and pressure plate. Where there are two clutch plates, a separator formed of a pair of generally parallel plates is interposed between the clutch plates, one separator plate having an annular fulcrum ridge, which may be slotted, contacting the other plate to equilize loading on the clutch plates.

12 Claims, 2 Drawing Sheets

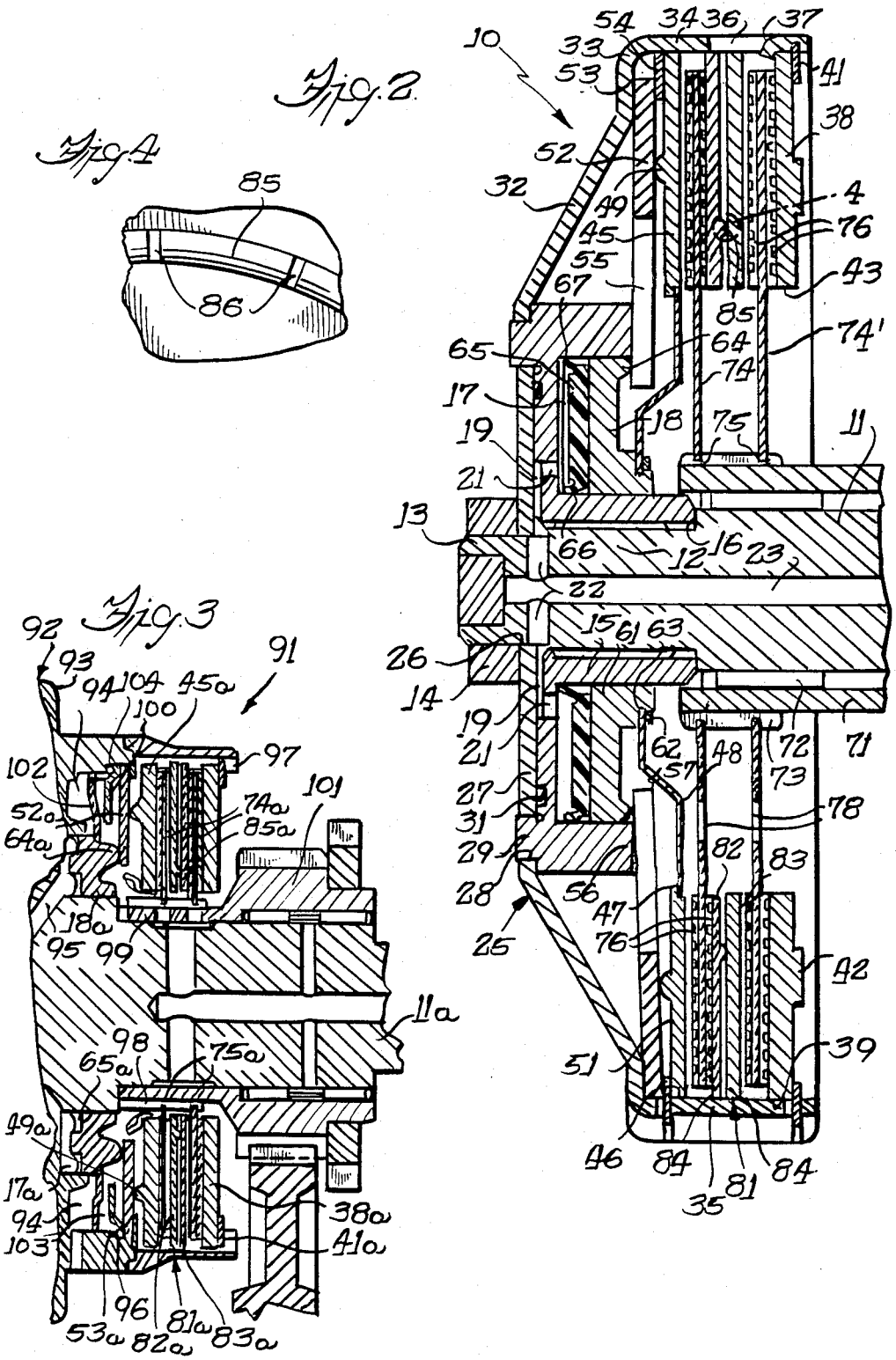

STARTING CLUTCH FOR A CONTINUOUSLY VARIABLE TRANSMISSION

BACKGROUND OF THE INVENTION

The present invention relates to a hydraulically-actuated starting clutch for a continuously variable transmission in an automotive vehicle. Continuously variable transmissions have been known for a number of years as a driving means located between a vehicle engine and the road engaging wheels to provide a smooth acceleration without the usual shifting of gears by clutches and brake bands in an automatic transmission. A continuously variable transmission conventionally includes a pair of variable sheave pulleys, an endless belt extending between and in driving engagement with the pulleys and control means to alter the effective pulley diameters and thus change the belt ratio during operation of the vehicle.

In automotive applications, a hydraulically-actuated clutch is required on the driven pulley shaft as a starting device and to drive a shaft leading to forward/reverse gearing to drive the final differential for the road-engaging wheels. The starting clutch is positioned on the driven pulley shaft so that the pulleys can be constantly rotating in one direction and rotation is not interrupted when shifting from forward to reverse for vehicle operation. Thus, initiating movement of the vehicle is accomplished by a speed responsive friction starting device wherein the clutch is controlled by the control means for the pulleys.

In some transmission applications, it is desirable to use a two-friction plate clutch having an intermediate separator plate between the friction clutch plates and cooperating with the end plate and the movable pressure plate in the clutch housing. However, in clutch operation, the transmitted load tends to be concentrated toward the outer diameter of the friction plates which results in heavy load concentration at localized areas on the linings resulting in glazing and overheating thereof. The present invention overcomes the above-noted problem.

SUMMARY OF THE INVENTION

The present invention relates to an improved hydraulically-actuated starting clutch wherein a pair of clutch friction plates are operatively engaged with a shaft driving the forward/reverse gearing for the transmission containing this clutch. The clutch assembly includes a piston-actuated pressure plate and an end plate located in the clutch housing, and an intermediate two-part separator plate between the two clutch plates. The two-part separator plate comprises a pair of substantially parallel plates, with one plate provided with a fulcrum ridge on the surface facing and contacting the other plate of the pair and at an optimum radial location, wherein the second plate engages the fulcrum ridge of the first plate to transmit and evenly distribute the applied load over the friction surfaces.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view of the clutch taken on the irregular line 2—2 of FIG. 1.

FIG. 3 is a cross-sectional view similar to FIG. 2, but showing a different environment for the clutch assembly.

FIG. 4 is an enlarged elevational view of the circled portion of FIG. 2.

DESCRIPTION OF THE PREFERRED EMBODIMENTS

Figure 1:
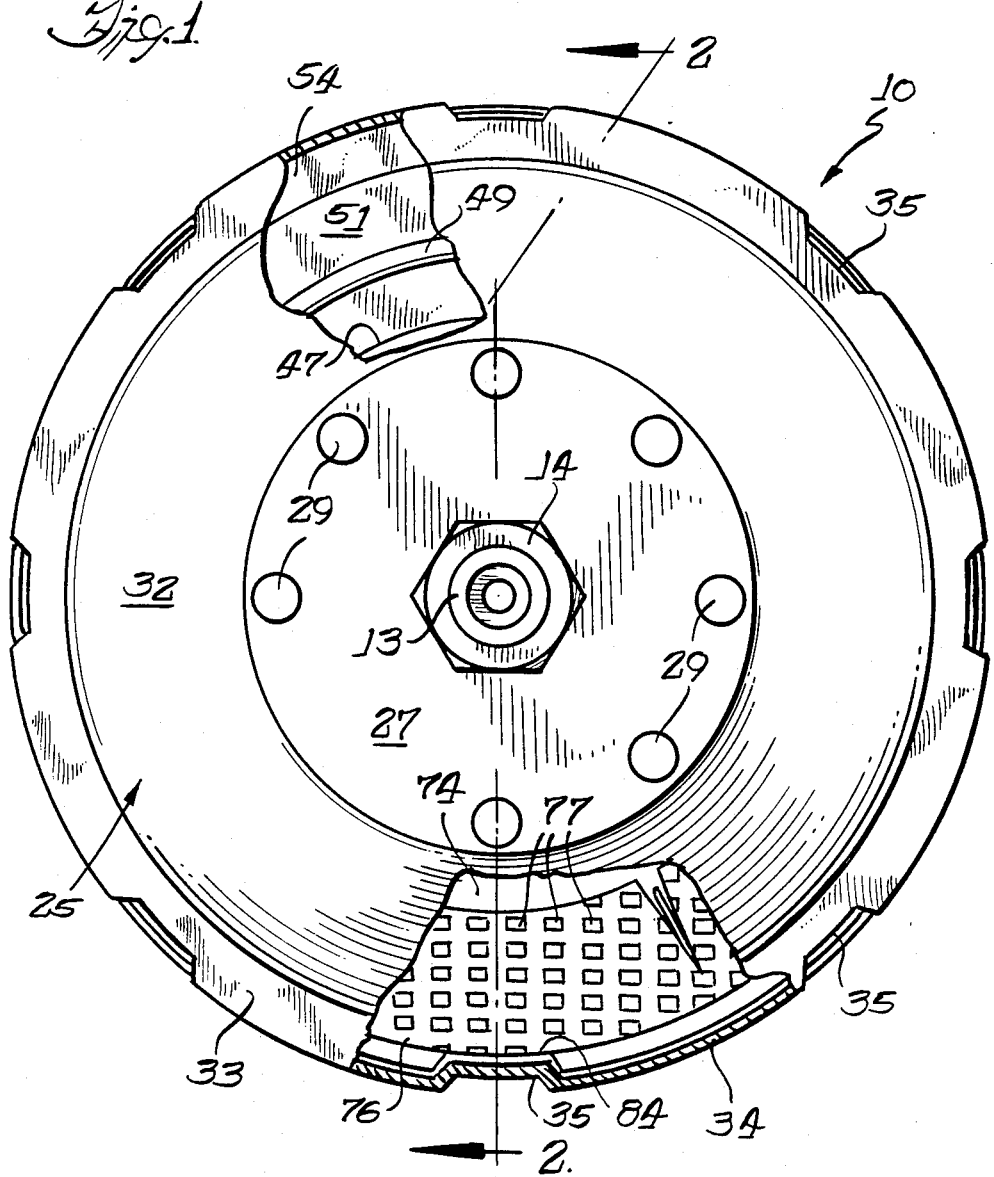
FIG. 1 is a front elevational view of the starting clutch with portions broken away to show the internal clutch structure.

Referring more particularly to the drawing wherein are shown illustrative embodiments of the present invention, FIGS. 1 and 2 disclose a hydraulically-actuated starting wet clutch 10 for use on the shaft 11 for the driven pulley (not shown) of a continuously variable transmission, such as illustrated in U.S. Pat. No. 4,241,618. The shaft 11 has a reduced diameter splined portion 12 terminating in a threaded end portion 13 for an internally threaded nut 14. An annular hub 15 having internal splines is received on the portion 12 to rotate therewith, with the inner hub end abutting a shoulder 16 defining the portion 12. The hub extends radially outwardly to form an annular pressure chamber 17 receiving an annular piston 18 therein. The face of the hub contains a plurality of radial passages 19 connecting to passages 21 communicating with pressure chamber 17; the inner ends of passages 19 communicating with radial passages 22 from a central passage 23 in the shaft 11.

A clutch housing or cover 25 has a central opening 26 in the generally radial wall 27 to receive the threaded shaft end 13 and is secured to the shaft and hub by the nut 14. Also, the cover has a plurality of annularly spaced openings 28 receiving projections 29 on the hub which are headed over to further secure the hub and cover together. Also, a resilient ring 31 is provided in an annular groove in the hub face to sealingly engage the cover. Beyond the projections 29, the cover wall extends radially outwardly and rearwardly in an inclined portion 32 terminating in a corner 33 for an axially-extending, generally cylindrical outer wall or flange 34 forming with the hub an enclosure for the clutch; the flange 34 having internally flattened ribs 35 (see FIG. 1) and openings 3 for the circulation of cooling oil in the clutch. Further, tabs 37 may be formed in the openings 36 cooperating with an end plate 38.

The end plate 38 has an outer periphery with circumferentially spaced axial channels 39 cooperating with the ribs 35 in the cover for rotation therewith. A snap ring 41 is located in a groove adjacent the end of the cover flange 34 to retain the end plate in the cover, and the tabs 37 are bent inwardly to axially secure the end plate in the clutch assembly. An annular rib 42 is formed on the back side of the end plate, which material may be removed for balancing of the clutch assembly.

An axially reciprocable pressure plate 45 also is provided with axial channels similar to channels 39 in its outer periphery cooperating with the ribs 35 to rotate with the cover, and an inner lip 47 is provided to interact with a retractor plate or spring 48. The pressure plate has an annular fulcrum ridge 49 on its surface 51 engaged by an intermediate portion of a Belleville or diaphragm spring 52 having its outer edge 53 received in the corner 33 of the cover and retained therein by a snap ring 54 located in an interrupted annular groove formed in the cover ribs 35. The inner portion of the spring is divided into fingers 55 resting on the outer wall 56 of the hub forming the pressure chamber 17 when the piston is retracted.

The piston 18 is formed with an inner hub 61 encompassing the hub 15 and having a snap ring 62 in a groove therein retaining the inner edge 63 of the retractor spring 48. An annular rib or lip 64 is formed on the outer periphery of the piston to engage the inner ends 57 of the spring fingers 55. An annular resilient piston sealing ring 65 is located in the pressure chamber 17 behind the piston 18 with inner and outer sealing lips 66 and 67, respectively, engaging the chamber walls.

A sleeve shaft 71 encompasses the shaft 11 and is rotatably mounted thereon through needle bearings 72. The end of the sleeve shaft located within the cover is splined at 73 to accommodate a pair of clutch plates 74,74' having central splined openings 75,75; each plate having opposed friction facings 76,76 which are grooved at 77 (FIG. 1) in a conventional waffle pattern. Between the clutch plates is positioned a two-part separator 81 formed of a pair of separator plates 82 and 83; each plate having axial channels 84 (FIG. 1) receiving the ribs 35 of the cover flange. The plate 82 has an annular fulcrum ridge 85 on the surface facing the other plate 83 and at an optimum radial location so as to transmit and evenly distribute the applied load on the friction faces. This separator plate 82 with the fulcrum ridge 85 acts as an intermediate load reaction point of the first friction plate 74 and as an apply load point of the second friction plate 74' with an overall reaction point being at the outer diameter of the outer end plate 38. This arrangement of selective reaction and transmission of the applied load provides a uniform load distribution over the entire surface of the friction plates and prevents high unit loading at localized areas.

FIG. 2 discloses the starting clutch at idle rpm with the piston 18 retracted and the friction plates disengaged from the pressure plate 45, intermediate separator 81 and end plate 38. As the vehicle engine accelerates, the hydraulic pressure in the central passage 23 in shaft 11 increases, as well as the shaft rpm, with the increased pressure being transmitted through radial passage 22 and 19 and openings 21 to the pressure chamber 17 behind the piston seal 65. The piston 18 is urged to the right as seen in FIG. 2, with the lip 64 acting on the inner edges 57 of the Belleville spring fingers 55 to cause the spring 52 to pivot about the corner 33 and snap ring 54 and engage the fulcrum ridge 49 on the pressure plate 45 to urge the plate towards end plate 38. Thus, the pressure plate 45 engages the first friction plate 74, which then engages the two-plate separator 81 to engage the second friction plate 74' and then the end plate 38.

Cooling oil is directed toward the interior of the clutch cove 25 within the inner periphery 43 of the end plate and through openings 78 in the clutch plates 74,74' for distribution along both surfaces of the two friction plates through the waffle pattern grooves 77 in the clutch facings 76 by centrifugal force of the rotating members; the oil exiting through openings 36. Although shown as a continuous solid ridge, the fulcrum ridge 85 may be radially slotted about the circumference at 86 to provide additional cooling of both the separator plates 82 and 83 and the innermost clutch facings 76. The clutch is released upon decrease in the hydraulic pressure, and the retractor spring 48 acts to retract the pressure plate 45 and disengage the clutch plates 74,74'.

FIG. 3 discloses an alternate embodiment of clutch 91 utilized as one of a pair of clutches in a continuously variable transmission; the clutch acting when engaged to rotate a forward drive gear and a second clutch is actuated for a reverse drive gear. Like parts of the clutch will have the same reference numerals with the addition of a script a. A driven pulley 92, a portion of which is shown, has a fixed sheave 93 with a chamber 94 formed therein around the shaft 11a for the clutch assembly 91. A central passage communicates with an annular pressure chamber 17a in chamber 94 through inclined passages 95; the chamber 17a housing an annular piston 18a and an annular resilient seal 65a.

The outer axially extending wall 96 of the sheave 93 has internal splines 97 cooperating with the splined peripheries of the pressure plate 45a, intermediate separator 81a and end plate 38a; a snap ring 41a in a groove retaining the end plate in position. Interleaved between the pressure plate, separator and end plate are a pair of clutch plates 74a having central splined openings 75a receiving the exterior splines 98 on a sleeve extension 99 of forward gear pinion 101. The plates 74a include friction facings with suitable grooving, such as shown in FIG. 1. The separator 81a includes a pair of separator plates 82a and 83a, with one plate 82a having an annular fulcrum ridge 85a on the surface facing the other plate 83a; which ridge may be optionally slotted.

A Belleville or diaphragm spring 52a is located in the chamber 94 with its outer periphery 53a pivotally mounted in the wall 96 in a manner similar to the embodiment of FIG. 2, its inner periphery engaging an annular lip or rib 64a on the piston 18a and an intermediate portion contacting an annular fulcrum ridge 49a on the pressure plate 45a. This clutch operates in substantially the same way as the clutch 10 of FIG. 2 except that hydraulic pressure is applied to the piston 18a only when forward rotation of the vehicle wheels is desired, and a decrease in pressure allows diaphragm spring to return to its normal state and retract the piston 18a. In addition, due to space restrictions, the centrifugal hydraulic balance of the clutch is achieved by a sealed chamber 103 consisting of a balance the plate 100 which also provides a pivot point for Belleville spring 52a, a seal and plate assembly 102, a sealing ring 104 and the wall 96. The centrifugal balance in the chamber 103 is achieved in the same manner as described for the balance plate in U.S. Pat. No. 4,709,795.

The present invention provides a novel clutch arrangement and assembly for the transmission and even distribution of the applied load on the friction faces of the clutch and the appended claims are intended to cover all reasonable equivalents of the structure.

I claim:

1. A hydraulically-actuated starting clutch assembly for a vehicle transmission comprising a driving shaft, an enclosure secured to the shaft for rotation therewith and defining an annular pressure chamber therein, an annular piston reciprocably mounted in the chamber, the enclosure having an outer wall, a reciprocable pressure plate actuated by said piston and an end plate mounted in said enclosure for rotation therewith, and a sleeve shaft encompassing and rotably mounted on said driving shaft, the improvement comprising a pair of clutch plates mounted on said sleeve shaft for rotation therewith and having friction facings located between said pressure plate and end plate, a separator located between said clutch plates and mounted in said enclosure for rotation therewith, said separator comprising a pair of generally parallel plates, and means to evenly distribute the applied load of the clutch on the friction faces comprising an annular fulcrum ridge formed on one of the two parallel plates and contacting the other plate.

2. A hydraulically-actuated starting clutch assembly as set forth in claim 1, wherein cooling oil slots are formed in said fulcrum ridge.

3. A hydraulically-actuated starting clutch assembly as set forth in claim 1, wherein said fulcrum ridge is formed on one separator plate at a point radially intermediate the inner and outer edges thereof.

4. A hydraulically-actuated starting clutch assembly as set forth in claim 1, including a diaphragm spring having its outer periphery pivotally mounted in said enclosure and its inner periphery in contact with said piston, said pressure plate having a fulcrum ridge at a radial location intermediate the edges thereof contacting the diaphragm spring.

5. A hydraulically-actuated starting clutch assembly as set forth in claim 4, wherein said annular fulcrum ridge is at a radial location between the plates.

6. A hydraulically-actuated starting clutch assembly as set forth in claim 1, in which said enclosure comprises a hub secured onto said driving shaft for rotation therewith and a cover secured to said hub and providing said outer wall.

7. A hydraulically-actuated starting clutch assembly as set forth in claim 6, wherein said cover has a generally radial wall and an outer cylindrical wall intersecting at a corner, and a diaphragm spring pivotally mounted in said corner and having its inner periphery engaged by said piston.

8. A hydraulically-actuated starting clutch as set forth in claim 1, wherein said enclosure defines a chamber radially outwardly of said piston, a balance plate extending radially inwardly into said chamber from said outer wall to approximately the outer periphery of said piston, a seal and plate assembly mounted on said piston, and a sealing ring to provide a centrifugal hydraulic balance of the pressure chamber.

9. A hydraulically-actuated starting clutch assembly for a vehicle transmission operatively connected to a constantly rotating shaft, comprising a hub having a rear surface and mounted on the shaft for rotation therewith and having an annular pressure chamber formed therein, an annular piston reciprocably mounted in said chamber, a cover secured to said hub and having a generally radially extending wall terminating in an axially extending flange, an annular reciprocable pressure plate and an annular end plate in said cover and operatively connected for rotation therewith, a diaphragm spring having an outer periphery pivotally mounted in said cover and an inner periphery normally contacting the rear surface of said hub, a fulcrum ridge on said pressure plate at a radial location contacted by said diaphragm spring, a sleeve shaft rotatably mounted on said first mentioned shaft, at least one clutch plate mounted on said sleeve shaft and positioned between said pressure plate and end plate, and an annular retractor spring having an outer periphery engaging the inner periphery of said pressure plate and an inner periphery connected to said piston.

10. A hydraulically-actuated starting clutch assembly as set forth in claim 9, wherein said annular piston includes an inner hub connected to said retractor spring and an outer annular lip contacting the inner periphery of said diaphragm spring.

11. A hydraulically-actuated starting clutch assembly as set forth in claim 9, wherein a lip is formed on the inner periphery of said pressure plate contacting the outer periphery of said retractor spring.

12. A hydraulically-actuated starting clutch assembly as set forth in claim 9, including tabs formed in said cover flange and bent inward to engage said end plate and prevent axial movement thereof.

* * * * *